(12) United States Patent
Englestead et al.

(10) Patent No.: US 10,433,637 B1
(45) Date of Patent: Oct. 8, 2019

(54) WORK SURFACE

(71) Applicants: J Mitchell Englestead, Las Vegas, NV (US); Carl Cunningham, Las Vegas, NV (US)

(72) Inventors: J Mitchell Englestead, Las Vegas, NV (US); Carl Cunningham, Las Vegas, NV (US)

(*) Notice: Subject to any disclaimer, the term of this patent is extended or adjusted under 35 U.S.C. 154(b) by 0 days.

(21) Appl. No.: 16/002,282

(22) Filed: Jun. 7, 2018

(51) Int. Cl.
*A47B 5/06* (2006.01)
*B62B 5/00* (2006.01)
*A47B 5/02* (2006.01)

(52) U.S. Cl.
CPC ............... *A47B 5/06* (2013.01); *A47B 5/02* (2013.01); *B62B 5/00* (2013.01)

(58) Field of Classification Search
CPC .. A47B 31/06; A47B 5/00; A47B 5/06; D06F 81/06
USPC .............................. 108/42, 47, 48
See application file for complete search history.

(56) References Cited

U.S. PATENT DOCUMENTS

| 380,562 | A | | 4/1888 | Garver | |
|---|---|---|---|---|---|
| 520,920 | A | | 6/1894 | Garver | |
| 634,450 | A | | 10/1899 | Garver | |
| 1,391,755 | A | * | 9/1921 | Boysen | A47B 31/00 108/47 |
| 1,518,099 | A | * | 12/1924 | Neiswender | A47B 31/06 108/47 |
| 1,738,415 | A | * | 12/1929 | Wittlinger | A47B 31/06 108/47 |
| 1,769,271 | A | | 7/1930 | Parsons | |
| 1,952,377 | A | * | 3/1934 | Lack | B60N 3/007 108/47 |
| 2,253,288 | A | | 8/1941 | De Lucchi | |
| 4,337,751 | A | * | 7/1982 | Sampson | A47J 37/0786 108/47 |
| 4,357,881 | A | * | 11/1982 | De Long | A47B 23/02 108/135 |
| D301,650 | S | | 6/1989 | Germain | |
| D321,991 | S | * | 12/1991 | Menges, Sr. | D6/335 |
| 5,415,421 | A | | 5/1995 | Godwin | |
| 5,839,772 | A | * | 11/1998 | Toole | B62B 1/20 296/32 |
| D404,882 | S | | 1/1999 | Shuchart et al. | |
| 5,996,507 | A | * | 12/1999 | Joseph | B60N 3/001 108/125 |
| 6,193,265 | B1 | | 2/2001 | Yemini | |
| 6,547,309 | B1 | | 4/2003 | Franklin et al. | |
| 6,736,073 | B2 | * | 5/2004 | Ryburg | A45C 7/00 108/42 |
| 6,984,066 | B2 | * | 1/2006 | Borom | A61B 6/0442 108/42 |

(Continued)

*Primary Examiner* — Jose V Chen
(74) *Attorney, Agent, or Firm* — Weide & Miller, Ltd.

(57) ABSTRACT

A work surface that attaches to a portable transportation and storage device is provided. The work surface has a tray and legs. The tray has a planar top surface defined by a rear edge, a front edge, and side edges. A lip extends upward from the top surface along each edge. Attachment points on the tray mount the tray to the portable transportation and storage device. The legs have a leg clamping device that mounts the legs to the portable transportation and storage device. The legs include a height adjustable portion configured to selectively extend the length of the legs, and a pivot portion that is rotatable relative to the height adjustable portion.

19 Claims, 3 Drawing Sheets

(56) References Cited

U.S. PATENT DOCUMENTS

| | | | |
|---|---|---|---|
| 6,991,251 B2 | 1/2006 | Tomchak et al. | |
| 7,070,316 B1 * | 7/2006 | Roth | B28C 5/0893 |
| | | | 366/242 |
| 7,147,234 B2 | 12/2006 | Davis | |
| 7,444,773 B2 * | 11/2008 | Kolodziejczak, Sr. | |
| | | | G09F 21/04 |
| | | | 108/44 |
| 7,467,590 B1 * | 12/2008 | Meller | A47B 37/00 |
| | | | 108/90 |
| D677,852 S | 3/2013 | Atnip et al. | |
| 8,636,289 B2 * | 1/2014 | Skijus | B62B 1/20 |
| | | | 280/47.31 |
| 8,827,386 B1 * | 9/2014 | Kennard | A47B 77/10 |
| | | | 108/48 |
| 8,857,347 B1 * | 10/2014 | Liu | A47B 5/02 |
| | | | 108/47 |
| 8,997,658 B2 * | 4/2015 | Pipkorn | B62B 5/0013 |
| | | | 108/42 |
| 9,821,830 B1 * | 11/2017 | Matlock | B62B 5/0013 |
| 2005/0212238 A1 * | 9/2005 | Conley | B25H 1/04 |
| | | | 280/47.32 |
| 2010/0013179 A1 | 1/2010 | Zhijun | |

* cited by examiner

WORK SURFACE

BACKGROUND

The disclosed embodiments relate to adjustable work surfaces used the construction industry, both commercial and residential. More specifically, the disclose embodiments relate to adjustable work surfaces which can be mounted on portable storage or transport equipment such as wheel barrows, hand trucks, carts, etc.

In the construction industry, many tasks must be done in a repeated fashion that require the worker the bend over, squat down, or kneel to give the worker access to the materials, parts, or equipment he is using to perform the task. Many workers are required to utilize portable storage or transport equipment to move the materials to the location where the work is completed.

Each time the worker is required to bend, squat, or kneel to perform a task, they are putting themselves into a potential situation where an industrial accident could happen. Any time spent bending, squatting, or kneeling may be considered time that is not productive.

In the construction industry, some products are hazardous or toxic, and thus must not be spilled on the ground. Accordingly, there is a need in the construction industry for a work surface that conveniently allows a worker to remain productive and that prevents hazardous material from being spilled.

SUMMARY

The disclosed embodiments relate to an adjustable work surface which attaches to transportation equipment to allow workers to perform tasks without bending, squatting, or kneeling. Portable transportation device such as wheel barrows are commonly used at work sites, and a disclosed work surface attaching to such a device allows the worker to work standing up while being able to pull ingredients or parts from the transportation device and perform the required task without bending over, squatting or kneeling making the worker more productive and reducing the chance of injury. The work surface allows materials spilled to be directed into a collection container. This allows products harmful to the environment to be collected instead of spilled.

In one embodiment, a work surface that attaches to a portable transportation and storage device is provided. The work surface has a tray and legs. The tray has a planar top surface defined by a rear edge, a front edge, and side edges. A lip extends upward from the top surface along each edge. Attachment points on the tray mount the tray to the portable transportation and storage device. The legs have a leg clamping device that mounts the legs to the portable transportation and storage device. The legs include a height adjustable portion configured to selectively extend the length of the legs, and a pivot portion that is rotatable relative to the height adjustable portion.

In some embodiments, the portable transportation and storage device is a wheel barrow. The rear edge and the front edge of the tray may have a length to cover a width of the wheel barrow, and the side edges may have a length less than one half of a length of a bin of the wheel barrow. In some instances, the tray may be disposed over the wheel barrow such that the tray extends past a rear side of the bin of the wheel barrow. Thus, the tray may cover less than half, or less than one fourth, of a top area of the bin of the wheel barrow.

In some embodiments, the attachment protrusions are disposed on a bottom surface of the tray adjacent to the front edge and the side edges. The attachment protrusions may comprise a through hole to receive an axle about which the tray is rotatable. The axle may extend through tray clamping devices disposed adjacent to the attachment protrusions. The tray clamping devices are configured to clamp to the portable transportation and storage device.

In one embodiment, the leg clamping device comprises a D-clamp that is mounted to handles of the wheel barrow. The leg clamping device may comprise inserts disposed within the D-clamp that conform to a profile of the handles. The height adjustable portion of the legs may be disposed above and may be connected to the leg clamping device. The height adjustable portion may have a first section and a second section that are configured to slide relative to one another to set the length of the height adjustable portion. One of the first and second sections may attach to the tray. The pivot portion may be disposed below and may be attached to the leg clamping device.

In some embodiments, the tray has a cutout formed in the rear edge of the tray.

In another embodiment, the tray clamping device may attach to the upright structural members of a common hand truck (dolly). The adjustable legs attached to the opposite side of the tray may attach to the structural uprights and allow the work surface to be adjusted to the required position needed for work to be performed. Also attached to the structural uprights are another set of adjustable legs that would pivot into position to stabilize the hand truck while work is performed.

In another embodiment the work surface is attached to an immobile storage container not having wheels for transportation purposes. When installed work may be performed utilizing product stored in the container on the work surface installed above the container. The tray clamping devices and the adjustable legs may attach to the sides of the container to allow the work surface to be adjusted to the required position.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
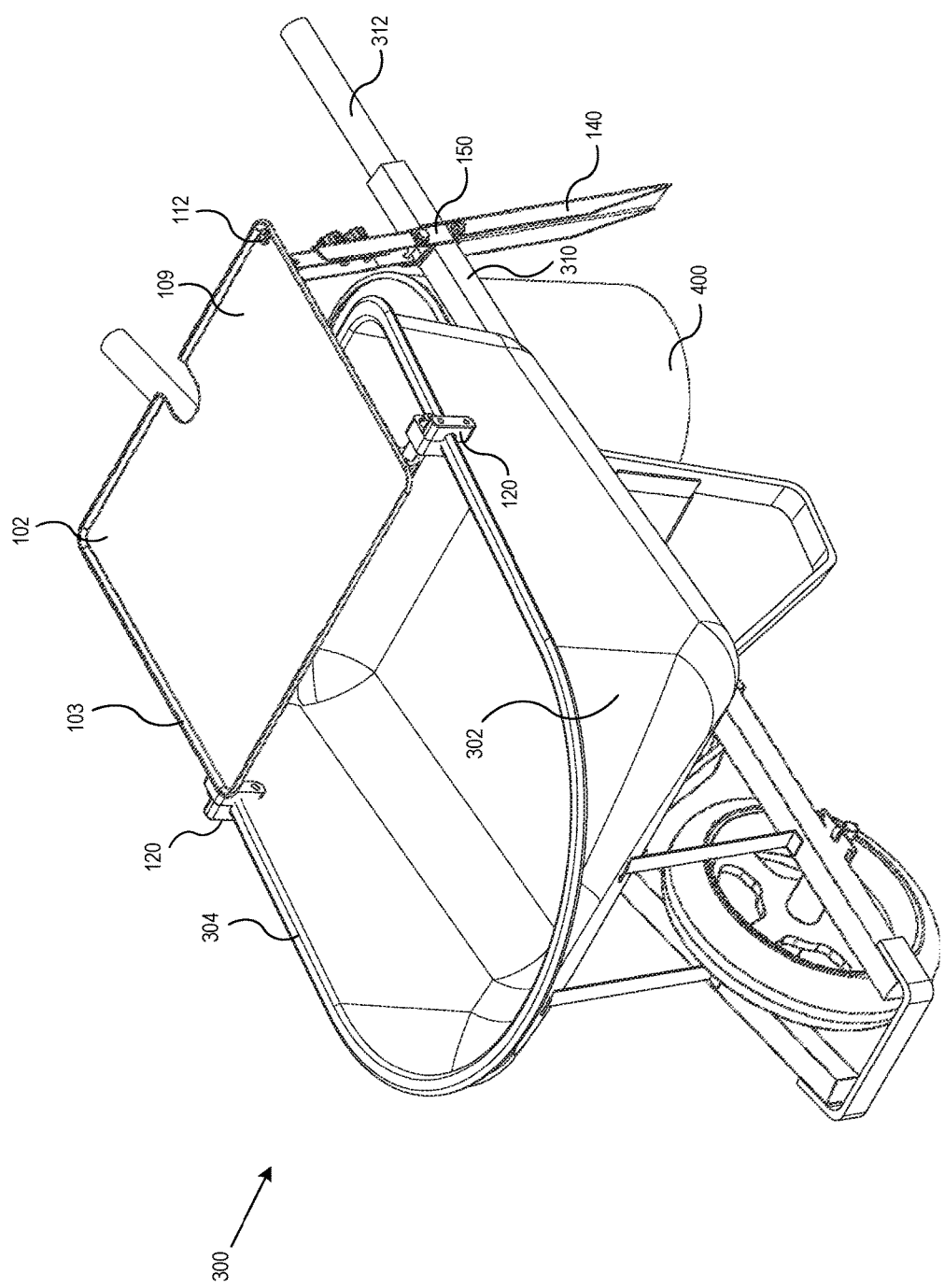
FIG. 1 is a perspective view of a work surface mounted to a wheelbarrow, according to an exemplary embodiment.

FIG. 1 shows a perspective view of a work surface mounted to a wheelbarrow, according to an exemplary embodiment. In this embodiment, the work surface is described with specific references relevant to the concrete industry. However, the work surface can be used for other applications in construction and other industries.

Referring to FIG. 1, a work surface 100 according to one embodiment is attached to a wheel barrow 300. The work surface 100 comprises a tray 102 that is configured to sit above the bin 302 of the wheel barrow 300 without preventing access to the bin 302 of the wheelbarrow. The tray 102 provides a working surface for an operator of the wheel barrow 300 and work surface 100.

The work surface 100 comprises clamps 120 that mount the work surface 100 to the upper edge 304 of the bin 302 of the wheel barrow 300. The work surface further comprises legs 140 that attach to handles 310 of the wheel barrow 300. Preferably, the legs 140 attach to the handles 310 forward of a hand grip 312 via a clamp 150. The legs 140 are configured to be adjustable to which in turn adjust the incline of the tray 102 of the work surface 100.

Figure 2:
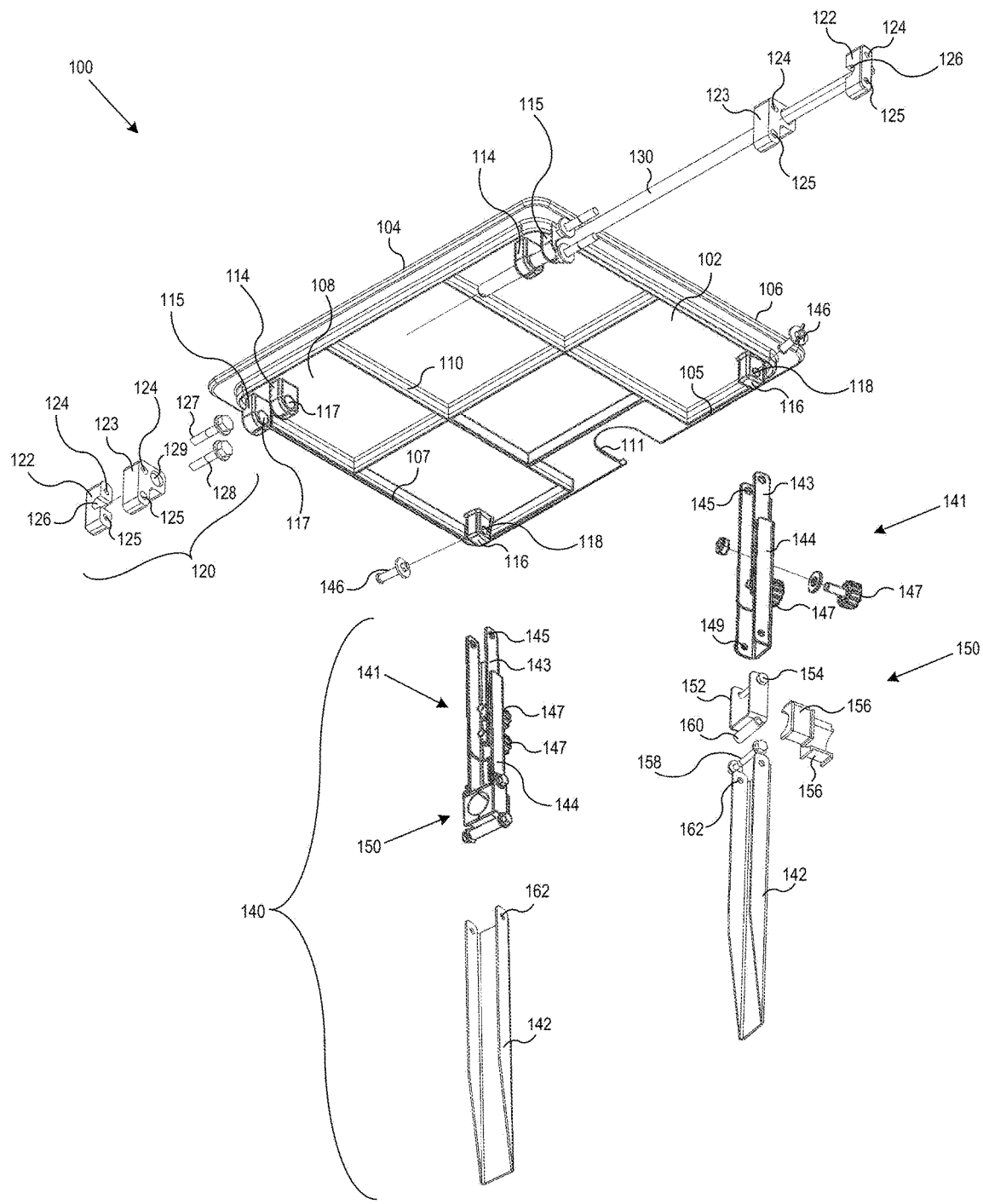
FIG. 2 is an exploded view of the work surface, according to an exemplary embodiment.
Figure 3:
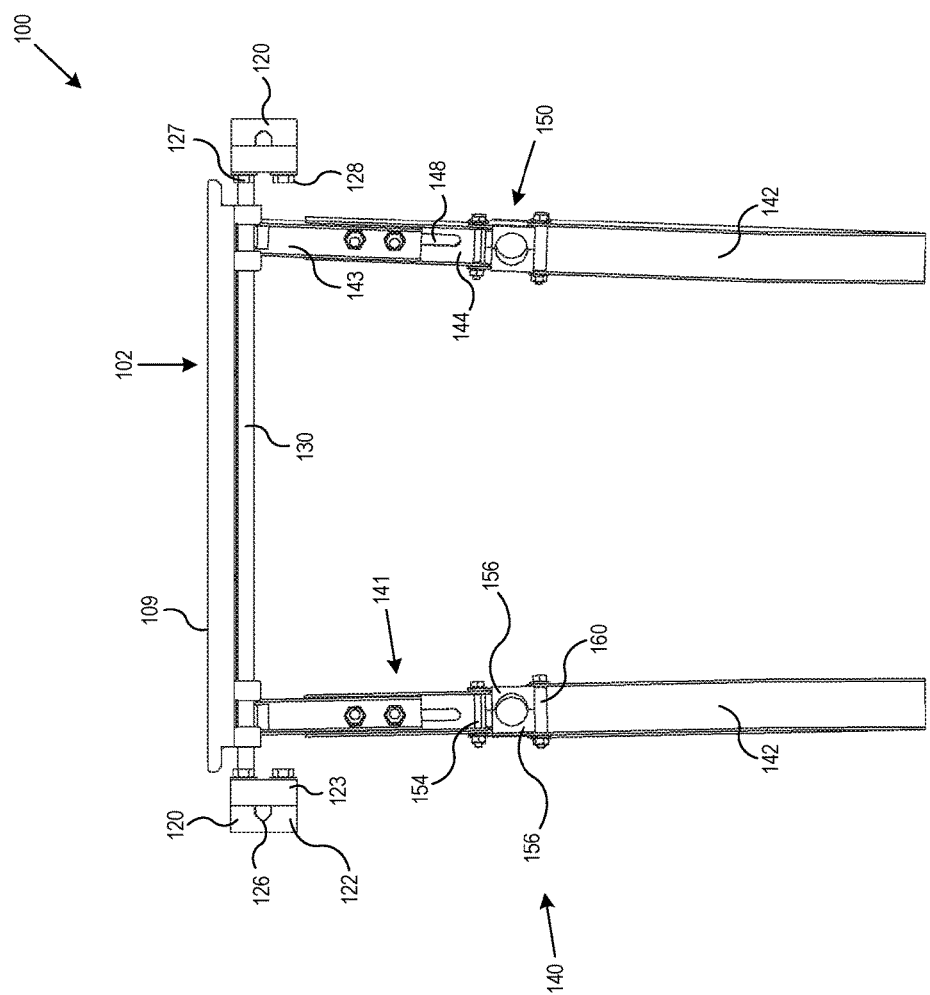
FIG. 3 is a front view of the work surface un-attached to any transportation device, according to an exemplary embodiment.

FIG. 2 shows an exploded view of the work surface, according to an exemplary embodiment, and FIG. 3 is a front view of the work surface. The tray 102 of the work surface 100 is shown in a substantially rectangular shape having rounded corners. However, the tray 102 may take on any number of shapes such as a square, trapezoid, circle, etc. Here, the tray has a front edge 104, a rear edge 105 opposite the front edge 104, and two side edges 106 and 107. As shown the front edge 104 and rear edge 105 are sized such that the width of the tray is substantially the same as the width of a wheel barrow 300 (see FIG. 1). The length of the side edges 106, 107 is set such that the wheel barrow bin 302 is accessible even when the work surface 100 is attached to the wheel barrow (See FIG. 1). Furthermore, the work surface 100 may be positioned such that at least a portion of the tray 102 extends past the rear of the bin 302 of the work surface. The length of the side edges 106, 107 may be half of the length of the wheel barrow bin 302 or smaller. The tray 102 may be configured to cover less than half of a top area of the wheel barrow bin 302. In one example, the tray 102 covers less than one fourth of the top area of the wheel barrow bin 302.

The tray 102 further comprises a top surface 109 (FIG. 1). The top surface may be a flat planar surface and may comprise a lip 103 that extends upwards along each of the front edge 104, rear edge 105, and side edges 106, 107 that helps maintain materials on the tray 102. The top surface 109 may also comprise a leveling indicator 112 to help the operator level the work tray 102 as desired.

Returning to FIG. 2, the tray 102 comprises a bottom surface 108. To add strength to the tray 102, ribs 110 may be built up from the bottom surface 108 of the tray 102 to provide structural rigidity and strength to the tray 102. The rear edge 105 may further comprise a cutout 111. The cutout 111 may serve as a drainage point to control movement of material from the tray 102. For example, the combination of the lip 103 and cutout 111 may direct material to the cutout and into a bucket 400 (FIG. 1). The lip 103 is omitted at the cutout 111, thus allowing material or liquid to escape the top surface 109 of the tray 102 at the cutout 111.

The bottom surface 108 further comprises attachment protrusions 114, 115, 116 that project from the bottom surface that facilitate attachment to the wheel barrow 300. The attachment protrusions 114, 115, 116 include forward attachment protrusions 114, 115 disposed in front corners of the tray 102 adjacent to the front edge 104 and side edges 106, 107, and include rear attachment protrusions 116 disposed in rear corners of the tray 102 adjacent to the rear edge 105 and the side edges 106, 107.

The front attachment protrusions 114, 115 each comprise a through hole 117. The through hole 117 is configured to allow a front axle 130 to extend therethrough. The interface between the through hole 117 and the front axle 130 allows for free rotation therebetween. This allows the tray 102 to be rotatable about the front axle 130.

As mentioned above, clamps 120 are provided to attach the work surface 100 to the edge of the wheel barrow 300.

The clamps 120 comprise outside clamping portion 122 and an inside clamping portion 123. Each of the clamping portions 122, 123 comprise a first through hole 124 that receives a first bolt 127. The first bolt 127 provides the clamping force between the outside clamping portion 122 and the inside clamping portion 123.

Each of the clamping portions 122, 123 also comprise a second through hole 125. The second through hole 125 facilitates attachment to the wheel barrow 300. For example, a second bolt 128 may extend through each of the through holes 125 of the clamping portions 122, 123 and through a hole in the bin 302 of the wheelbarrow 300 to position the work surface 100 to the wheel barrow 300. Alternatively, the through holes 125 may be threaded and a set screw may be tightened against the wheel barrow bin 302 to position the work surface 100 to the wheel barrow 300.

The outside clamping portion 122 further comprises a notch 126. The notch 126 corresponds with a top edge 304 of the wheel barrow 300 to receive the top edge 304. This further enhances the clamping ability of the clamp 120 on the wheel barrow 300. Of course, the notch 126 could also be formed in the inside clamping portion 123 in other embodiments.

The inside clamping portion 123 comprises a projection with an axle through hole 129. The front axle 130 is configured to extend through axle through hole 129. The axle through hole supports the weight of the front axle 130, and thus provides a base support for the tray 102 of the work surface 100.

As mentioned above, the rear attachment protrusions 116 are disposed in rear corners of the tray 102 adjacent to the rear edge 105 and the side edges 106, 107. The rear attachment protrusions 116 are configured to attach the tray 102 to the legs 140 of the work surface 100. In this embodiment, the rear attachment protrusions 116 comprise a through hole 118 that receives a clevis pin 146. The clevis pin 146 locks the legs 140 to the tray 102 via the rear attachment protrusions 116.

The legs 140 comprise an upper, extendible section 141 and a lower, rotatable section 142. The upper section 141 of the legs 140 comprises a first sliding portion 143 and a second sliding portion 144. Here, the first sliding portion 143 is configured to nest within and slide relative to the second sliding portion 144. The first sliding portion has through holes 145 disposed near an upper edge that interface with the clevis pin 146 to attach to the rear attachment protrusions 116 of the tray 102. As shown in FIG. 3, the second sliding portion 144 comprises an elongated hole 148. The first and second sliding portions 143, 144 may be fastened together at any number of positions via knob bolts 147. The knob bolts prevent relative sliding of the first and second portions 143, 144 when tightened, fixing the height of the upper, extendible section 141 of the legs 140.

The second sliding portion 144 further comprises through holes 149 disposed near a lower edge that interface with the clamp 150. As mentioned above, the clamp 150 secures the legs 140 of the work surface 100 to the handles 310 of the wheel barrow 300. The clamp 150 may comprise a D-clamp 152 that is tightened onto the handles 310 via a bolt 154. The D-clamp 152 is configured to attach to the square shaped handle 310 forward of the grip portion 312 of the handle 310. If the wheel barrow 300 includes a circular (or other shaped) handle 310, inserts 156 may be fitted into the D-clamp to fit onto the circular handles 310.

Attached to a lower surface of the D-clamp is a pivot tube 160. The pivot tube 160 facilitates the connection between the upper leg 141 and the lower leg 142. The lower leg includes through holes 162. A bolt 158 is inserted through the pivot 160 and the through holes 162 to attach the lower legs 142 to the upper legs 141. When the bolt 158 is not tightened, the lower leg 142 may rotate about the pivot 160. When the lower leg is in a desired position, the bolt 158 may be tightened to prohibit movement of the lower leg 142.

Other connection methods may also be used other than those described herein. For example, the connection between the upper leg 141 and lower leg 142 may comprise a bi-stable mechanism to selectively position the lower leg from straight position to a bent position. Further modifications may be made. For example, a rubber cover may be added to a bottom end of the lower leg 142 to enhance stability of the work surface.

While the present embodiment shows the work surface attached to a wheel barrow, the work surface may also be mounted to other portable storage or transport devices such as hand trucks.

The work surface 100 provides a convenient and easy way for a user to perform tasks at various locations, for example on a work site. The tray 102 is conveniently and ergonomically positioned to allow the user to work thereon. Further, the tray 102 does not prevent access to the bin 302 of the wheel barrow 300. If hazardous materials are placed on the work surface 100, the user can safely maintain them on the work surface by adjusting the levelness of the work surface via the legs 140, and can safely remove the material from the tray 102 via the cutout 111.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A work surface that attaches to a portable transportation and storage device, the work surface comprising:
    a tray comprising
        a planar top surface defined by a rear edge, a front edge, and side edges,
        a lip extending upward from the top surface along the rear edge, the front edge, the side edges,
        attachment protrusions configured to mount the tray to the portable transportation and storage device, the attachment protrusions being disposed on a bottom surface of the tray adjacent to the front edge and the side edges and each comprising a through hole, and
        an axle extending through the through hole of the protrusions, the tray being rotatable about the axle; and
    legs comprising
        a leg clamping device configured to mount the legs to the portable transportation and storage device,
        a height adjustable portion configured to selectively extend the length of the legs, and
        a pivot portion that is rotatable relative to the height adjustable portion.

2. The work surface of claim 1, wherein the portable transportation and storage device is a wheel barrow.

3. The work surface of claim 2, wherein the rear edge and the front edge have a length to cover a width of the wheel barrow, and the side edges have a length less than one half of a length of a bin of the wheel barrow.

4. The work surface of claim 3, wherein the tray is disposed over the wheel barrow such that the tray extends past a rear side of the bin of the wheel barrow.

5. The work surface of claim 4, wherein the tray covers less than half of a top area of the bin of the wheel barrow.

6. The work surface of claim 5, wherein the tray covers less than one fourth of the top are of the bin of the wheel barrow.

7. The work surface of claim 2, wherein the leg clamping device comprises a D-clamp that is configured to be mounted to handles of the wheel barrow.

8. The work surface of claim 7, wherein the leg clamping device further comprises inserts disposed within the D-clamp that are configured to conform to a profile of the handles.

9. The work surface of claim 7, wherein the height adjustable portion of the legs is disposed above and is connected to the leg clamping device, the height adjustable portion including a first section and a second section that are configured to slide relative to one another to set the length of the height adjustable portion, one of the first and second sections being attached to the tray.

10. The work surface of claim 9, wherein the pivot portion is disposed below and attached to the leg clamping device.

11. The work surface of claim 1, further comprising tray clamping devices configured to be disposed and clamped onto the portable transportation and storage device adjacent to the attachment protrusions, wherein the axle extends through the tray clamping devices.

12. The work surface of claim 1, wherein the tray further comprises a cutout formed in the rear edge of the tray.

13. A work surface that attaches to a wheel barrow, the work surface comprising:
    a tray comprising
        a planar top surface defined by a rear edge, a front edge, and side edges, and
        connection mechanisms configured to mount the tray to the wheel barrow; and
    legs that are attached to the tray, the legs comprising
        a leg clamping device configured to mount the legs to the wheel barrow,
        an upper leg section comprising a height adjustable portion, the upper leg section being disposed between the leg clamping device and the tray, and the upper leg section being rotatably connected to the tray and the leg clamping device, and
        a lower leg section connected to the leg clamping device opposite the upper leg section.

14. The work surface of claim 13, wherein the rear edge and the front edge have a length to cover a width of the wheel barrow, and the side edges have a length less than one half of a length of a bin of the wheel barrow, and wherein the tray comprises a lip extending upward from the top surface along the rear edge, the front edge, the side edges.

15. The work surface of claim 13, the tray is disposed over the wheel barrow such that the tray extends past a rear side of the bin of the wheel barrow and covers less than half of a top area of the bin of the wheel barrow, and wherein the tray further comprises a cutout formed in the rear edge of the tray.

16. The work surface of claim 13, wherein
    the tray further comprises an axle and tray clamping devices,
    the connection mechanisms are formed as protrusions that are disposed on a bottom surface of the tray adjacent to the front edge and the side edges, the protrusions each comprising a through hole to receive the axle about which the tray is rotatable, and
    the axle extends through the tray clamping devices, the tray clamping devices being disposed adjacent to the attachment protrusions, and the tray clamping devices being configured to clamp to the wheel barrow.

17. The work surface of claim 13, wherein
    the height adjustable portion is configured to selectively extend the length of the upper leg section, the lower leg section is rotatable relative to the upper leg section, and the leg clamping device comprises a D-clamp that is configured to be mounted to handles of the wheel barrow.

18. The work surface of claim 17, wherein the height adjustable portion comprises a first section and a second section that are configured to slide relative to one another to set the length of the height adjustable portion, one of the first and second sections being attached to the tray.

19. A work surface that attaches to a to a portable transportation and storage device, the work surface comprising:

a tray comprising
- a planar top surface defined by a rear edge, a front edge, and side edges, and
- connection mechanisms configured to mount the tray to the portable transportation and storage device; and legs that are attached to the tray, the legs comprising
- a leg clamping device configured to mount the legs to the portable transportation and storage device,
- an upper leg section comprising a height adjustable portion, the upper leg section being disposed between the leg clamping device and the tray, and the upper leg section being rotatably connected to the tray and the leg clamping device, and
- a lower leg section connected to the leg clamping device opposite the upper leg section.

* * * * *